United States Patent

[11] 3,629,632

| [72] | Inventor | Richard H. Loupe<br>Seal Beach, Calif. |
|---|---|---|
| [21] | Appl. No. | 59,503 |
| [22] | Filed | July 30, 1970 |
| [45] | Patented | Dec. 21, 1971 |
| [73] | Assignee | Altralite, Inc.<br>Long Beach, Calif. |

[54] FLYWHEEL ELECTRICAL GENERATOR
5 Claims, 3 Drawing Figs.

[52] U.S. Cl. ............................................. 310/74,
310/68 D, 310/153, 310/211
[51] Int. Cl. .................................................. H02k 7/02
[50] Field of Search .......................................... 310/74,
153, 168, 171, 180, 184, 185, 202–207, 68, 68 D,
156; 74/572; 322/51, 90

[56] References Cited
UNITED STATES PATENTS

| 3,530,366 | 9/1970 | Schwarm | 322/90 |
| 3,114,851 | 12/1963 | Santi | 310/153 |
| 3,034,005 | 5/1962 | Carr | 310/153 |
| 3,527,266 | 9/1970 | Santi | 310/153 |
| 3,192,439 | 6/1965 | Shaw | 310/153 |
| 3,037,148 | 5/1962 | Gayler | 310/156 |
| 3,422,339 | 1/1969 | Baker | 310/68 |

*Primary Examiner*—Gerald Goldberg
*Assistant Examiner*—R. Skudy
*Attorney*—Nilsson, Robbins, Wills & Berliner ABSTRACT: A generator for use with a small rotary engine incorporating permanent magnets in its flywheel, the generator being mounted exteriorly of the flywheel and within the flywheel housing, if any is used. The magnets move relative to a stator having a "double-E" configuration with two poles, each of which carry a pair of windings. The windings on each pole are connected in electrical opposition through diodes to supply the desired electrical current. The stator structure is laminated and has preferred physical dimensions.

PATENTED DEC 21 1971

3,629,632

INVENTOR.
RICHARD H. LOUPÉ
BY
Nilsson, Robbins, Wills & Berliner
Attorneys 3,629,632

FLYWHEEL ELECTRICAL GENERATOR

BACKGROUND AND SUMMARY OF THE INVENTION

Over the years, a vast number of structural configurations have been proposed for electrical generators. Of course, the demands imposed upon such units vary between broad extremes, depending upon particular applications. For example, an entire class of electrical generators have been developed to supply electrical energy to auxiliary devices on large vehicles. Conventionally, a vehicle's propulsion system is used to drive a generator, which in turn supplies electrical energy for the vehicle's lights, battery, and the like.

The demands of a generator for vehicle use tend to be particularly severe with regard to small vehicles, e.g. two-wheel units and snowmobiles. Specifically, the nature of such vehicles frequently imposes severe limitations upon size, weight, and power demand of each component, including the generator. Additionally, economic considerations are sometimes of prime importance with regard to small two-wheel vehicles. As a consequence, a need has existed for a compact, effective, lightweight and economical generator for use on small vehicles, to supply auxiliary devices such as lights with electrical energy and to charge a wet-cell battery carried by the vehicle. In view of the increasing popularity of such vehicles, both for trail use and on congested highways, the need for such a generator has intensified.

In particular, there is a need for such a generator which can be used with existing engines, both for original equipment installation and for sale to individual owners of vehicles which are not presently provided with any such generator.

There is also a need for such a generator for use with power-driven chain-saws, as, for example to provide enough electrical power to energize a light bulb to permit the use of the saw at night.

In the past, it has been somewhat conventional practice to supply electrical energy (for spark) to a small internal-combustion engine by using a magneto which utilizes the engine flywheel as a rotor. Thus, permanent magnets have been affixed in the flywheel of the engine to revolve relative to a simple stator, for the generator of alternating voltage to supply the engine's ignition system. However, such generators have conventionally been capable of supplying only very limited power. That is, prior generators incorporating the flywheel of an internal combustion engine have had limited power capabilities, and, in general, such structures have not been totally acceptable to fill the demands of a generator for use on a two-wheel vehicle.

In general, the present invention resides in a generator configuration which utilizes the flywheel of an internal combustion engine as a rotor having a plurality of permanent magnets, and which is mounted exteriorly of the flywheel and within the flywheel housing, if any used. The permanent magnets are rotated with reference to a stator comprising a plurality of salient poles which are bounded by salient magnetic-circuit protuberances to define a "double-E" configuration in the case of a two-pole generator. Each magnetic pole carries two separate windings which are connected in electrical opposition by means of rectifiers to provide direct current, as for use by auxiliary apparatus on a small vehicle. For engines in which the flywheel rotates at a relatively slow speed or for installations where more electrical energy is required, two such generators can be mounted in operative relationship with the same flywheel, and with the generators connected in series circuit.

BRIEF DESCRIPTION OF THE DRAWINGS

In the drawings, which constitute a part of this specification, an exemplary embodiment demonstrating various objectives and features hereof is set forth, specifically.

DESCRIPTION OF THE ILLUSTRATIVE EMBODIMENT

As required, a detailed illustrative embodiment of the invention is disclosed herein. However, it is to be understood that the embodiment merely exemplifies the invention which may take several different forms that are structurally different from those described in detail herein. Therefore, the specific structural and functional details disclosed herein are not be interpreted as limiting, but merely as a basis for the claims defining the scope of the invention.

Figure 1:
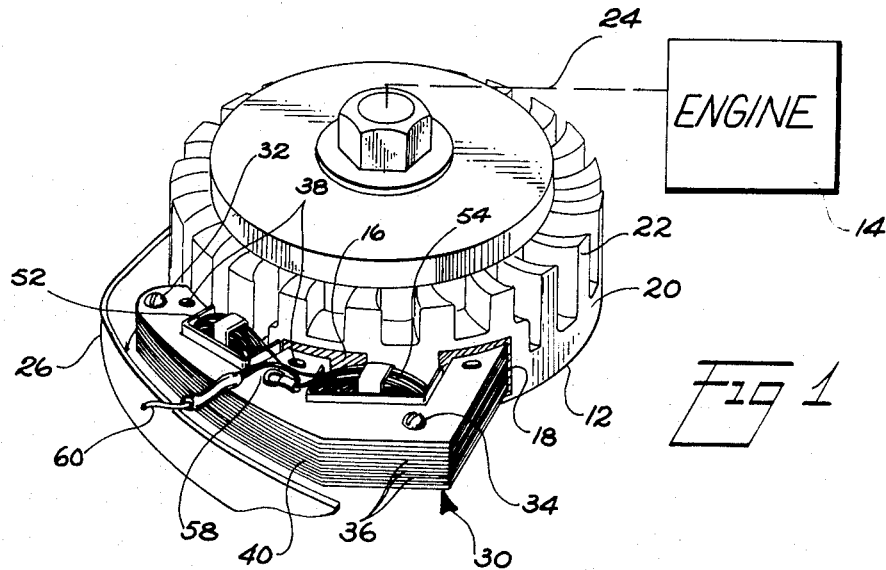
FIG. 1 is a perspective and block diagram illustrative of a single generator constructed in accordance with the present invention.

Referring initially to FIG. 1, there is shown a flywheel 12 which is connected to and which forms a part of a small engine as represented by a block 14. Although the engine 14 forms no part of the present invention, it is readily apparent that the unit may simply comprise a single-cylinder rotary engine as widely used with two-wheel vehicles and with motor-driven chain-saws.

The flywheel 12 contains at least one pair of magnets 16 and 18 embedded therein to provide arcuate faces thereof which are flush with the peripheral annular surface 20 of the flywheel 12. It is to be noted that the flywheel 12 incorporates fins 22; however, such elements are not germane to the present invention. By way of example, the flywheel 12 may comprise an aluminum casting in which the permanent magnets 16 and 18 are embedded. These magnets 16 and 18 may comprise any of a variety of permanent-magnetic materials, such as various nickel-iron alloys.

The connection of the flywheel 12 to the engine 14 may be in accordance with conventional prior structures and that connection or coupling is represented simply by a dashed line 24 in FIG. 1. Structurally, the flywheel 12 is usually (although not necessarily) enclosed in a housing 26 which is fragmentarily shown. It is important to recognize the advantages of preserving any such housing 26 small in size, and this is one of the attendant advantages of the present invention.

Figure 2:
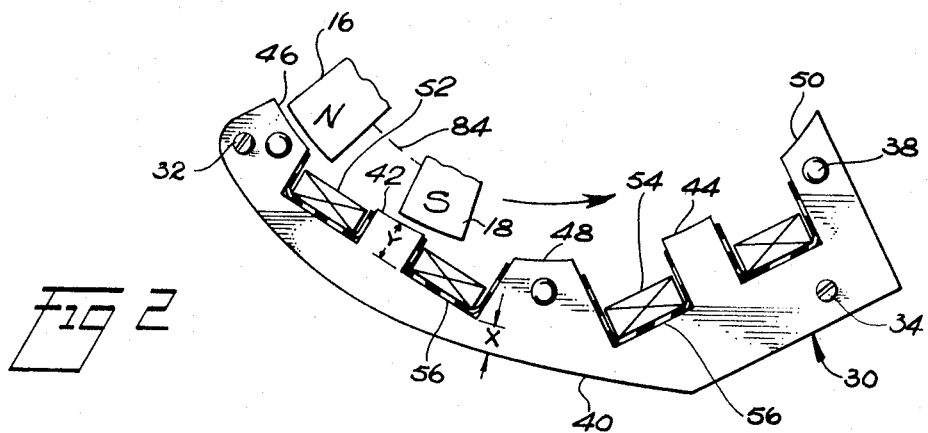
FIG. 2 is a somewhat diagrammatic plan view of a portion of the structure shown in FIG. 1.

A stator 30, constructed in accordance with the teachings of the present invention, is mounted exteriorly of the flywheel and preferably within the housing 26 and is affixed to said housing by mounting bolts 32 and 34. The stator 30 comprises a stack of individual laminations 36, which are held together in a conventional manner by pins 38. The individual laminations 36 as well as the composite stack comprising the stator 30, define a "double-E" configuration as is best illustrated in FIG. 2. That is, the stator includes a somewhat curved base section 40 from which five members extend. Specifically, (FIG. 2) the base section 40 is somewhat arcuate about a center of rotation for the stator, and salient poles 42 and 44 extend toward said center of rotation from the section 40. To afford complete magnetic circuits, extensions 46, 48 and 50 are located on either side of the poles 42 and 44 and also extend inward toward the center of rotation. It is to be noted that the faces of the poles 42 and 44, as well as the faces of the extensions 46, 48 and 50, are somewhat arcuate to conform with the shape of the peripheral annular surface 20 (FIG. 1) of the flywheel 12.

The individual laminations 36 of the stator 30 can be stamped or otherwise formed of transformer iron, as well known in the prior art. With regard to the stator 30, some preferred size limitations have been determined to exist. Specifically, it has been found desirably to limit the size relationship between the height of the shorter pole, pole 42, in reference to the minimum width of the base section 40. These dimensions are indicated respectively by the letters "$y$" and "$x$" in FIG. 2. It has been found desirable with a view toward obtaining somewhat optimum effectiveness for this system, to maintain the ratio of $y/x$ at 1.5. In any event, the range of that ratio has been found to be desirably limited between 0.5 and 2.75.

The individual laminations 36 are stacked to form the stator 30, after which, pins 38 are set through the laminations to accomplish an integral unit. Thereafter, coils 52 and 54 (FIGS. 1 and 2) are fitted over the poles 42 and 44 respectively. It is to be noted that spacers 56 of insulating material are provided between the coils 52 and 54 and the body of the stator 30. The coils 52 and 54 each include two separate windings, as described in detail below. Consequently, in the illustrative embodiments, a total of four electrically separate windings are provided upon the two poles 42 and 44. These windings are interconnected by connections 58 (FIG. 1) as described below, and are brought out to a single output conductor 60 providing a positive potential with reference to the "ground" or housing 26.

Figure 3:
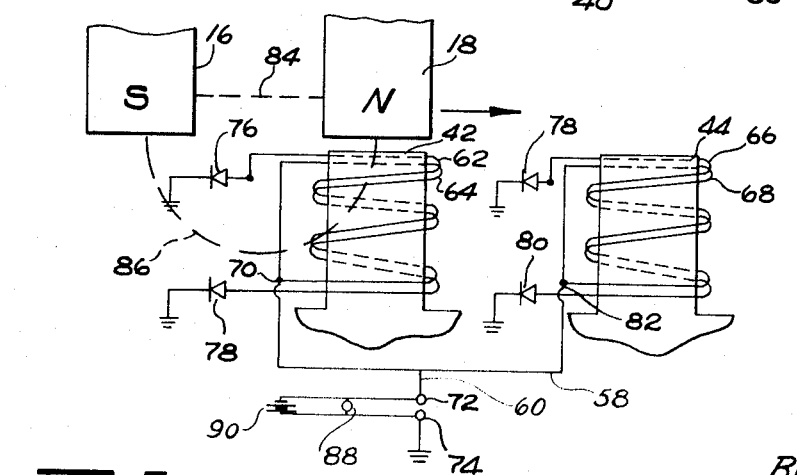
FIG. 3 is an electrical diagrammatic view of the system of FIG. 1.

In considering the electrical aspects of this system, FIG. 3 is a linear presentation which shows the electrical circuit in full detail. Specifically, as shown in FIG. 3, the pole 42 carries two separate windings 62 and 64 which jointly form the coil 52. Somewhat similarly, windings 66 and 68 comprise the coil 54 carried upon the pole 44. It is to be noted that although the windings 62 and 64 and the windings 66 and 68 are actually wound in parallel, in view of the connections therebetween, these windings are electrically in the form of bifilar windings. Thus, the bottom of the windings 62 is connected to the top of the windings 64 at a junction point 70 which is connected through the aforementioned connections 58 and the output conductor 60 to an output terminal 72 with reference to a ground terminal 74. The upper end of the winding 62 and the lower end of the winding 64 are then connected through diodes to ground. Specifically, the upper end of the winding 62 is connected through a rectifier diode 76 while the lower end of the winding 64 is connected through a rectifier diode 78. Somewhat similarly, the upper end of the winding 66 is connected through a rectifier diode 78 to ground while the lower end of the winding 68 is connected through a rectifier diode 80 to ground. In further similarity, the upper end of the winding 68 is connected to the lower end of the winding 66 at the junction point 82 which is also connected through the aforementioned connector 58 and the output conductor 60 to the output terminal 72. The lighting system 88 for the vehicle and a wet-cell battery 90 for energizing the lighting system when the vehicle engine is stopped, if desired, are connected between the output terminal 72 and the ground terminal 74.

If a second similar stator and winding assembly were to be used with the same flywheel, as where the flywheel rotates at a relatively slow speed or where more output is required than can be obtained with a single assembly, the two output terminals 72 would be connected in series circuit relation to "-ground."

Considering the operation of the generator with references to FIGS. 2 and 3, as the magnets 16 are rotated with reference to the stator 30, each of the coils 52 and 54 experiences a change in magnetic flux, whereby electrical currents are developed in the windings 62, 64, 66 and 68. As indicated by dashed line 84, the relationship between the magnets 16 and 18 is fixed as they travel in a circular path mounted on the flywheel 12 (FIG. 1). As represented in FIG. 3, by a dashed line 86, a magnetic field exists between the magnets 16 and 18. As these magnets revolve, the magnetic field sequentially embraces the windings on the poles 42 and 44. Specifically, it may be seen that as the magnet 18 comes into alignment with the pole 42, as shown in FIG. 3, the windings 62 and 64 have each received an induced voltage. However, the oppositely poled diodes 76 and 78 (with reference to the windings 62 and 64) allow current flow through only one of the windings to the output terminal 72. Subsequently, as the magnet 18 moves away from the pole 42, the alternate winding will carry a current through the alternate diode with the result that current flow again takes place to the output terminal 72.

With regard to the operation of the system as described herein, practical analysis of the individual waveforms generated has been found to be rather difficult in view of the high speeds of operation and the complex interplay between the individual windings. However, in the use of the system illustrated in FIG. 1 in conjunction with a small single-cylinder two-cycle engine, output currents have been provided which are entirely satisfactory and adequate to energize the lights on the vehicle driven by the engine and additionally maintain the battery in a state of charge when the flywheel rotates at a speed of about 5,000–7,000 r.p.m. The levels of such output have been determined to be far in excess of levels which might be anticipated from conventional units restricted to the size and weight of a unit constructed in accordance herewith. As indicated, a detailed electrical analysis of the waveforms developed in the system hereof has been difficult to accomplish; however, it appears that the passage of each magnet over a pole accomplishes two voltage impulses which are provided in rectified form to an output terminal. Accordingly, bursts of rectified direct current are available between the terminals 72 and 74.

It appears that the effective operation of the system hereof resides primarily in the bifilar winding structure in cooperation with the oppositely poled diodes as well as the magnetic circuit afforded by the structure of the stator 30. The extension 46, 48 and 50 in cooperation with the magnets 16 and 18 appear to afford effective magnetic circuits for improved operation. Also, as indicated above, analysis of the system further tends to suggest an optimum dimensional relationship between the height of the shorter pole and the width of the thinnest section of the magnetic circuit.

Of course, as mentioned above, the system may take various forms and include forms in which an increased number of poles or magnets are provided. Furthermore, the system may be nonsymmetrical as disclosed herein or may comprise a full annular arrangement of poles for increased power output.

What is claimed is:

1. An electrical generator for supplying electrical current to an output, comprising:
    a first member including a plurality of poles for producing at least one magnetic field;
    a second member having a "double" configuration of laminar metal rotatably mounted with reference to said first member and essentially defining five interconnected poles in magnetic circuits with said first member;
    a plurality of coils mounted on said poles of said second member, each of said coils including first and second windings; and
    connection means including rectifier means connecting each of said first and second windings for opposed current flow to said output.

2. An electrical generator according to claim 1 wherein said windings in each of said coils are in a parallel relationship and wherein said connection means includes means for interconnecting the opposed ends of said windings at a junction point.

3. An electrical generator according to claim 2 wherein said connection means includes a rectifier for each of said windings connected between one end of each winding and a common terminal.

4. An electrical generator according to claim 1 wherein the ratio between the height of a pole defined by said second number in relation to the thickness of the magnetic circuit from said pole to said first member is approximately 1.5.

5. A stator for a power-generating unit for an internal-combustion engine having a flywheel with a plurality of permanent magnets in the outer periphery thereof, comprising:
    means defining a magnetic flux path having a plurality of salient poles and adapted to be mounted adjacent to the flywheel and including a laminated core having a curved base portion and first, second, third, fourth and fifth salient poles in series relationship along the base portion, said poles being integral with the base portion and extending therefrom proximate to an arc which is of a shape complimentary with the outer periphery of the engine flywheel;
    a plurality of winding pairs, each pair being wound about a different salient pole; and means for rectifying the current in the windings of each pair in first and opposite senses, and means for connecting each winding in a parallel circuit with uniform rectification.

* * * * *